US012311641B2

(12) United States Patent
Brockway et al.

(10) Patent No.: US 12,311,641 B2
(45) Date of Patent: May 27, 2025

(54) COINCIDENT SURFACE MODIFICATIONS AND METHODS OF PREPARATION THEREOF

(71) Applicant: Nelumbo Inc., Hayward, CA (US)

(72) Inventors: Lance R. Brockway, Hayward, CA (US); David C. Walther, Hayward, CA (US)

(73) Assignee: NELUMBOINC., Hayward, CA (US)

( * ) Notice: Subject to any disclaimer, the term of this patent is extended or adjusted under 35 U.S.C. 154(b) by 824 days.

(21) Appl. No.: 17/255,283

(22) PCT Filed: Jun. 28, 2019

(86) PCT No.: PCT/US2019/039743
§ 371 (c)(1),
(2) Date: Dec. 22, 2020

(87) PCT Pub. No.: WO2020/006365
PCT Pub. Date: Jan. 2, 2020

(65) Prior Publication Data

US 2021/0268778 A1 Sep. 2, 2021

Related U.S. Application Data

(60) Provisional application No. 62/691,217, filed on Jun. 28, 2018.

(51) Int. Cl.
*B32B 15/20* (2006.01)
*B32B 18/00* (2006.01)
(Continued)

(52) U.S. Cl.
CPC .............. *B32B 18/00* (2013.01); *B32B 15/20* (2013.01); *B32B 37/06* (2013.01); *B32B 37/24* (2013.01);
(Continued)

(58) Field of Classification Search
CPC ......... B32B 18/00; B32B 15/20; B32B 37/06; B32B 37/24; B32B 2037/243;
(Continued)

(56) References Cited

U.S. PATENT DOCUMENTS 6,228,555 B1 * 5/2001 Hoffend, Jr. ........... B41M 5/465 430/273.1
6,229,555 B1 * 5/2001 Hadady ................ H04N 1/0473 347/132
(Continued)

FOREIGN PATENT DOCUMENTS

CN 201575646 U 9/2010
CN 102748987 A 10/2012
(Continued)

OTHER PUBLICATIONS

Aili, A., et al., Characteristics of Jumping Droplet-Enhanced Condensation on Nanostructured Micromesh Surface, 2016, ASME International Conference on Micro/Nanoscale Heat and Mass Transfer, V001T004A001.
(Continued)

*Primary Examiner* — Humera N. Sheikh
*Assistant Examiner* — Kevin Ct Li
(74) *Attorney, Agent, or Firm* — Fountainhead Law Group, PC; Jill A. Jacobson

(57) ABSTRACT

Methods are described for modification of a substrate with a surface modification material that includes a conversion layer deposited on the substrate surface and a deposited layer that is situated over the conversion layer. The methods include a conversion step and a deposition step that occur without intermediate processing steps in a process fluid that includes a metal and an organic substance.

23 Claims, 2 Drawing Sheets

Clean substrate → Conversion → Intermediate Processing → Deposition → Post Processing Clean substrate → Conversion-Deposition → Post Processing

(51) Int. Cl.

| | |
|---|---|
| ***B32B 37/06*** | (2006.01) |
| ***B32B 37/24*** | (2006.01) |
| *B82Y 30/00* | (2011.01) |
| *B82Y 40/00* | (2011.01) |

(52) U.S. Cl.
CPC ..... *B32B 2037/243* (2013.01); *B32B 2311/24* (2013.01); *B32B 2315/02* (2013.01); *B82Y 30/00* (2013.01); *B82Y 40/00* (2013.01)

(58) Field of Classification Search
CPC ... B32B 2311/24; B32B 2315/02; B32B 1/00; B82Y 30/00; B82Y 40/00; C23C 22/74; C23C 22/56
See application file for complete search history.

(56) References Cited

U.S. PATENT DOCUMENTS

| | | | |
|---|---|---|---|
| 8,540,889 | B1 | 9/2013 | Hartlove et al. |
| 9,147,633 | B2 | 9/2015 | Eid et al. |
| 9,362,201 | B2 | 6/2016 | Gavillet et al. |
| 2001/0023013 | A1 | 9/2001 | Yamanoto et al. |
| 2002/0172887 | A1* | 11/2002 | Wolk ..................... B41M 5/265 430/311 |
| 2004/0055892 | A1 | 3/2004 | Oh et al. |
| 2004/0118698 | A1 | 6/2004 | Lu et al. |
| 2005/0023584 | A1 | 2/2005 | Derderain et al. |
| 2006/0141268 | A1 | 6/2006 | Kalkan et al. |
| 2009/0181544 | A1* | 7/2009 | Dziobkowski ...... H01L 21/3148 257/E21.249 |
| 2010/0099012 | A1 | 4/2010 | Adzic |
| 2010/0203287 | A1 | 8/2010 | Jiang et al. |
| 2011/0198059 | A1 | 8/2011 | Gavillet et al. |
| 2011/0253007 | A1 | 10/2011 | Zastrau et al. |
| 2013/0244001 | A1 | 9/2013 | Wang et al. |
| 2013/0330501 | A1 | 12/2013 | Aizenberg et al. |
| 2014/0011013 | A1 | 1/2014 | Jin et al. |
| 2014/0017456 | A1 | 1/2014 | Xiao et al. |
| 2014/0182790 | A1 | 7/2014 | Hwang et al. |
| 2014/0208978 | A1 | 7/2014 | Sunder et al. |
| 2014/0231052 | A1 | 8/2014 | Takasawa et al. |
| 2014/0238646 | A1 | 8/2014 | Enright |
| 2014/0247556 | A1 | 9/2014 | Eid et al. |
| 2015/0284854 | A1* | 10/2015 | Özcan ..................... C23C 22/68 427/427 |
| 2016/0068703 | A1 | 3/2016 | Schmidt et al. |
| 2016/0097606 | A1 | 4/2016 | Xiao et al. |
| 2017/0282416 | A1 | 10/2017 | Kim et al. |
| 2021/0231290 | A1 | 7/2021 | Aspell et al. |

FOREIGN PATENT DOCUMENTS

| | | | | |
|---|---|---|---|---|
| CN | 103173832 | A | 6/2013 | |
| CN | 104451814 | A | 3/2015 | |
| EP | 0646187 | B1 | 10/2001 | |
| EP | 2752504 | B1 | 4/2016 | |
| WO | WO-2014012052 | A1 * | 1/2014 | ............. B05D 3/104 |
| WO | 2017/031391 | A1 | 2/2017 | |
| WO | 2018/053452 | A1 | 3/2018 | |
| WO | 2018/053453 | A1 | 3/2018 | |
| WO | 2018/132519 | A1 | 7/2018 | |
| WO | 2019183503 | A2 | 9/2019 | |
| WO | 2019/217755 | A1 | 11/2019 | |
| WO | 2020006365 | A1 | 1/2020 | |

OTHER PUBLICATIONS

Kang, S.M., et al., Directional Oil Sliding Surfaces with Hierarchical Anisotropic Groove Microstructures, Aug. 5, 2013, Adv. Mater. 25(40):5756-5761.

Lv, Y., et al., Fabrication of Superhydrophobic Films on Aluminum Foils with Controllable Morphologies, Jan. 11, 2013, Adv. Mat. Res., 641-642:414-417.

Miljkovic, N., et al., Condensation heat transfer on superhydrophobic surfaces, 2013, MRS Bull. 38:397-406.

Miljkovic, N., et al., Jumping-Droplet-Enhanced Condensation on Scalable Superhydrophobic Nanostructured Surfaces, 2013, Nano Lett. 13:179-187.

Miljkovic, N., et al., Modeling and Optimization of Superhydrophobic Condensation, 2013, J. Heat Transf.-Trans. ASME 135:14.

Mozalev, A., et al., The superhydrophobic properties of self-organized microstructured surfaces derived from anodically oxidized Al/Nb and Al/Ta metal layers, 2012, Electrochimica Acta 82:90-97.

Tuteja, A., et al., Design Parameters for Superhydrophobicity and Superoleophobicity, Jan. 1, 2011, MRS Bulletin 33 (8):752-758.

Zhao, J., et al., CoMn-layered double hydroxide nanowalls supported on carbon fibers for high-performance flexible energy storage devices, 2013, J. Mater. Chem. A, 1:8836-8843.

* cited by examiner

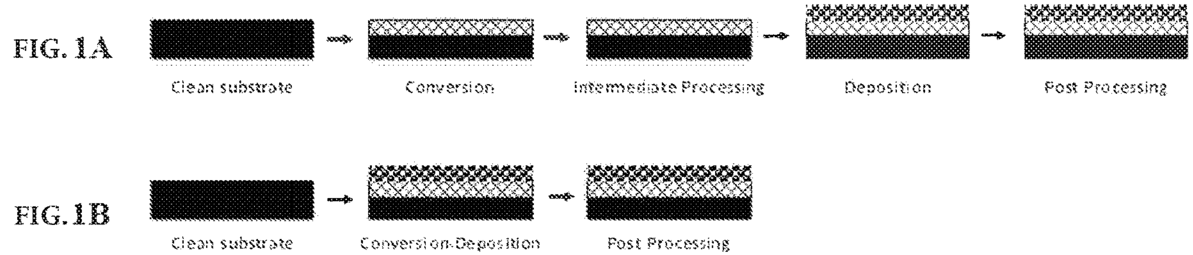
FIG. 1A
FIG. 1B
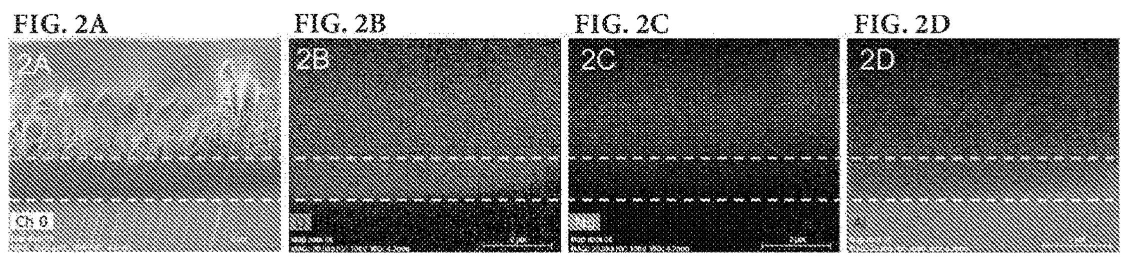
FIG. 2A FIG. 2B FIG. 2C FIG. 2D

COINCIDENT SURFACE MODIFICATIONS AND METHODS OF PREPARATION THEREOF

CROSS-REFERENCE TO RELATED APPLICATIONS

This application is a U.S. National Stage application under 37 C.F.R. § 371 of PCT Application No. US2019/039743, filed on Jun. 28, 2019, which claims the benefit of U.S. Provisional Application No. 62/691,217, filed on Jun. 28, 2018, which is incorporated by reference herein in its entirety.

FIELD OF THE INVENTION

The invention provides methods and compositions for modification of surfaces, in particular for improved heat transfer, and for other applications that utilize one or more process steps for surface modifications. Applications include corrosion resistance, painting, surface finishing, and adhesion.

BACKGROUND

Surface modifications are useful and beneficial for a variety of applications. Conversion layers are useful for altering surface properties and providing a strong interaction with the substrate. Deposited layers can be used to provide functional benefits such as improved or altered adhesion, optical, electrical and/or physical properties. Composite materials, which utilize a combination of conversion layers and deposited layers, may have beneficial properties from each of the layers and from the combination of layers. The processing requirement for a composite surface modification can require multiple steps with rinsing and cleaning operations and excess waste. There is a need for a simple process for the deposition of a dense conversion layer and a lower density structural layer. There is also a need for a process which can be used to generate multiple surface modifications in a single process tank and/or single process step.

BRIEF SUMMARY OF THE INVENTION

In one aspect, surface modifications are provided that comprise or consist of a conversion layer and a deposited layer on a substrate, wherein the conversion layer is between the substrate and the deposited layer. For example, the conversion layer may have a thickness less than about 50, 25, 10, 5, or 2 microns. For example, the deposited layer may have a thickness less than about 50, 25, 10, or 5 microns.

In some embodiments, the deposited layer includes a ceramic material. For example, the ceramic material may include a metal oxide, a metal hydroxide, or a combination thereof. In some embodiments, the ceramic material includes one or more of: a transition metal, a rare earth metal, aluminum, silicon, tin, and magnesium. For example, the ceramic material may include a transition metal such as, but not limited to, zinc, nickel, iron, cobalt, manganese, chromium, silver, tungsten, titanium, or copper. For example, the ceramic material may include a rare earth metal such as, but not limited to, cerium, lanthanum, or gadolinium.

In some embodiments, the deposited layer is nanostructured. Nonlimiting examples of nanostructured materials which the deposited layer may comprise or consist of are provided in PCT Application Nos. WO2018/053452 and WO2018/053453, which are incorporated by reference herein. In some embodiments, the structure is composite in nature, having different properties as a function of distance from the substrate. In some embodiments, the deposited layer does not include a binder or a resin. In some embodiments, the deposited layer and/or the conversion layer includes less than 5% carbon by mass. In some embodiments, the deposited layer and/or the conversion layer is polycrystalline.

In some embodiments, the substrate includes, but is not limited to, one or more of: aluminum, an aluminum alloy, iron, an iron alloy, carbon steel, stainless steel, galvanized steel, copper, a copper alloy, a zinc alloy, titanium, and a titanium alloy. In some embodiments, the substrate includes one or more alloy, such as an aluminum alloy or an iron alloy.

In some embodiments, the conversion layer includes a ceramic material. For example, the ceramic material may include a metal oxide, a metal hydroxide, or a combination thereof. In some embodiments, the ceramic material includes one or more of: a transition metal, a rare earth metal, aluminum, silicon, tin, magnesium, and cerium. For example, the ceramic material may include a transition metal such as, but not limited to, zinc, nickel, iron, cobalt, manganese, chromium, silver, tungsten, titanium, or copper. For example, the ceramic material may include a rare earth metal such as, but not limited to, cerium, lanthanum, or gadolinium.

In some embodiments, the conversion layer and the deposited layer include one or more common metal, such as, but not limited to, aluminum and/or magnesium. In some embodiments, the surface modification includes additional functionalization of the surface for a desired application of use. For example, functionalization may impart one or more desirable functional properties, such as, but not limited to, wettability modulation, color, or a primer functionality.

In some embodiments, a metal composition gradient is generated across the boundary between a dense conversion layer and a less dense deposited layer, which may provide beneficial properties, such as adhesion and stress relieving properties. In other embodiments, the metal composition gradient may provide beneficial properties such as electrical conductivity or ionic conductivity properties.

In some embodiments, the substrate material is included as part of the conversion layer or the deposited layer.

In some embodiments, the conversion layer and/or the deposited layer includes a dopant (e.g., a small amount of a metal), which may be included to alter one or more property of interest of the conversion layer and/or the deposited layer, for example, electrical conductivity or an optical property such as color.

In another aspect, processes are provided to modify a surface, wherein a substrate is modified with (a) a conversion step to add a conversion layer; and (b) a deposition step to add a deposited layer over the conversion layer, wherein steps (a) and (b) occur in the same processing medium, e.g., an aqueous solution that contains at least one metal salt and at least one organic substance, without any intermediate processing (including, but not limited to, rinsing, drying, or heating) between the conversion and deposition steps. In some embodiments, the conversion step and the deposition step occur in the same processing vessel. In some embodiments, the conversion step and the deposition step utilize the same process fluid, e.g., an aqueous solution that includes at least one metal salt and at least one organic substance (for example, but not limited to, hexamine, urea, triethylamine, and/or diamine). In some embodiments, the conversion step and the deposition step occur concurrently. In some embodiments, the process includes (c) a heat treatment step, after the conversion layer and the deposited layer have been deposited onto the substrate. In some embodiments, a dopant is included in the process fluid in which the conversion step and the deposition step take place.

In another aspect, heat exchangers are provided that include a modification of at least one surface with any of the surface modifications described herein, e.g., a conversion layer and a deposited layer on a substrate, wherein the converted layer is between the substrate and the deposited layer, wherein the conversion layer, deposited layer, and substrate include any of the compositions and/or properties described herein, and/or wherein the surface modification is prepared by any of the processes described herein.

In another aspect, semiconductors are provided that include a modification of at least one surface with any of the surface modifications described herein, e.g., a conversion layer and a deposited layer on a substrate, wherein the converted layer is between the substrate and the deposited layer, wherein the conversion layer, deposited layer, and substrate include any of the compositions and/or properties described herein, and/or wherein the surface modification is prepared by any of the processes described herein. In some embodiments, a semiconductor processing sequence is provided, wherein the surface modifications described above are used to generate other semiconductor materials of interest. For example, the semiconductor materials may be exposed to an acid solution to remove at least a portion of the deposited layer, resulting in a semiconductor with desired properties.

BRIEF DESCRIPTION OF THE DRAWINGS

FIG. 1A shows a typical process in which a conversion coating is applied to a clean substrate, followed by an intermediate processing step such as rinsing, drying, and/or heating. A deposition process such as a barrier coating or paint is then applied to the converted surface, followed by a post processing step such as rinsing, drying, or heating.

FIG. 1B shows the disclosed process by which a clean substrate can concurrently be modified with a conversion and deposition process, without the need for an intermediate processing step. An optional post processing step such as rinsing, drying, or heating can then be implemented as necessary.

FIG. 2A shows a cross sectional scanning electron microscope (SEM) image of a structured generated from the coincident process outlined in Example 2. Stabilization materials were added as shown in the figure during the examination process for image clarity. FIGS. 2B, 2C, and 2D show energy-dispersive spectroscopy (EDS) elemental maps of oxygen, magnesium, and aluminum, respectively. The dashed white lines indicate the transitions of the substrate (bottom), conversion layer (in the middle), and deposited layer (on the top)

DETAILED DESCRIPTION

Figure 3:
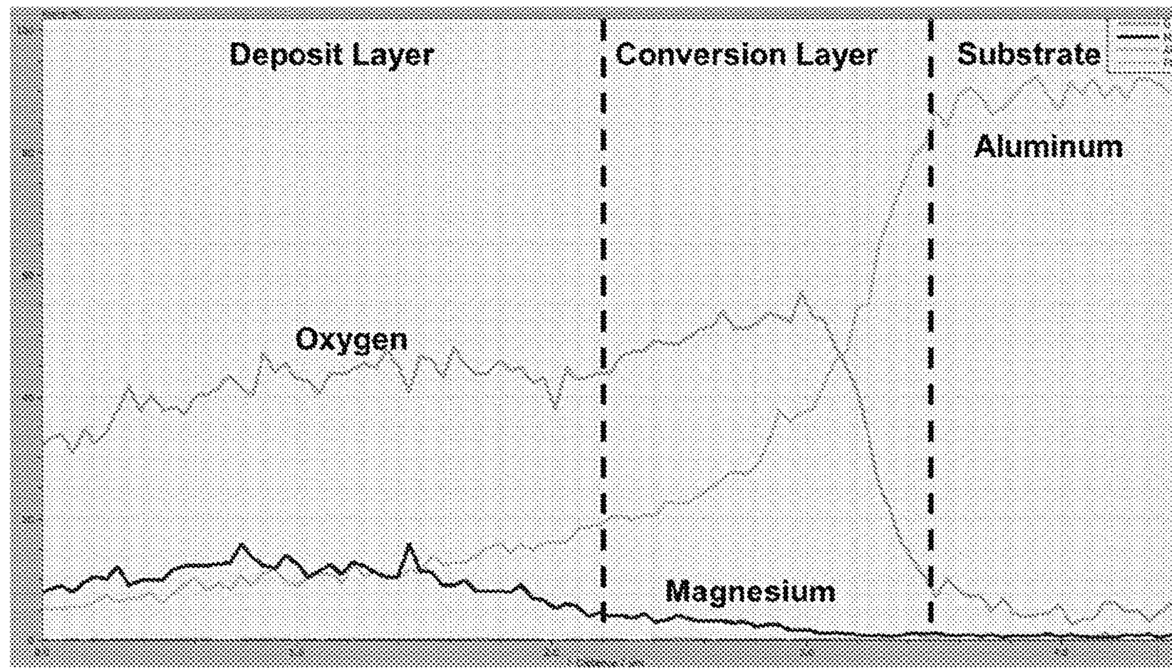
FIG. 3 is an energy-dispersive X-ray spectroscopy (EDX) line scan showing the compositional changes across the coincident deposit structure described in Example 2. The aluminum substrate is shown on the right side of the scan (lower section of SEM). The outer layer shows a Mg rich layer. The central conversion layer section shows a primarily AlOx layer. Also clearly seen are the diffusion and gradient layers that comprise this design.

Methods are provided for utilization of a single processing step to modify surfaces through the generation of a conversion layer and a deposited layer. The deposited layer may have a specific morphology. Surprisingly, it was observed that a single processing step resulted in the formation of a conversion layer and a deposited layer.

Definitions

Numeric ranges provided herein are inclusive of the numbers defining the range.

"A," "an" and "the" include plural references unless the context clearly dictates, thus the indefinite articles "a", "an,", and "the" as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

The term "about" as used herein when referring to a measurable value such as an amount, a temporal duration, and the like, is meant to encompass variations of ±20%, ±10%, ±5%, ±1%, or ±0.1% from the specified value, as such variations are appropriate to perform the disclosed methods.

The term "conversion layer" refers herein to a layer that comprises a portion of the initial substrate.

The term "deposited layer" refers herein to a layer on a substrate that is added onto the top of the substrate such as a paint or coating. It is additive in nature.

The term "gradients" refers herein to compositional changes across and adjacent to the primary layer interfaces (e.g., interface between substrate and conversion layer; interface between conversion layer and deposited layer).

The term "calcine" refers herein to the process of heating to high temperatures in air or oxygen. Heating in other controlled atmospheres (e.g., nitrogen) or vacuum are often also considered as calcining.

The term "dopant" refers herein to the inclusion of an additional element introduced into the conversion or deposited layer to affect the electrical, optical, or lattice stress handling properties. Typically a low amount of the dopant material can have a large impact.

A "nanostructured" coating refers to a coating composition that has a feature in at least one dimension that is less than 100 nanometers.

The term "polycrystalline" refers herein to solids that are composed of many crystallites of varying size, density, and orientation.

Processing Methods

Processing methods for preparing a modified surface are provided herein. In some embodiments, a substrate, e.g., a cleaned substrate, is submerged in an aqueous solution that includes at least one metal, e.g., transition metal, salt and at least organic substance that forms a metal-organic complex. In some embodiments, the metal may include, but is not limited to, a transition metal (such as, but not limited to, zinc, nickel, iron, cobalt, manganese, chromium, silver, tungsten, titanium, and copper), a rare earth metal (such as, but not limited to, cerium, lanthanum, or gadolinium), aluminum, silicon, tin, and/or magnesium. In some embodiments, the organic substance may include, but is not limited to, hexamethylene tetramine (HMTA; hexamine), urea, triethylamine, and/or diethylamine. In some embodiments, the substrate may include, but is not limited to, aluminum, an aluminum alloy, iron, an iron alloy, carbon steel, stainless steel, galvanized steel, copper, a copper alloy, a zinc alloy, titanium, and/or a titanium alloy.

In some embodiments, concentrations of reactants (e.g., metal salt, organic substance) range from about 10 mM to about 1 M. For example, reactant concentration may be any of about 10 mM, 25 mM, 50 mM, 75 mM, 100 mM, 125 mM, 150 mM, 175 mM, 200 mM, 225 mM, 250 mM, 275 mM, 300 mM, 325 mM, 350 mM, 375 mM, 400 mM, 425 mM, 450 mM, 475 mM, 500 mM, 525 mM, 550 mM, 575 mM, 600 mM, 625 mM, 650 mM, 675 mM, 700 mM, 725 mM, 750 mM, 775 mM, 800 mM, 825 mM, 850 mM, 875 mM, 900 mM, 925 mM, 950 mM, 975 mM, or 1 M, or any of about 10 mM to about 100 mM, about 50 mM to about 150 mM, about 100 mM to about 200 mM, about 150 mM to about 250 mM, about 200 mM to about 300 mM, about 250 mM to about 350 mM, about 300 mM to about 400 mM, about 350 mM to about 450 mM, about 400 mM to about 500 mM, about 450 mM to about 550 mM, about 500 mM to about 600 mM, about 550 mM to about 650 mM, about 600 mM to about 700 mM, about 650 mM to about 750 mM, about 700 mM to about 800 mM, about 750 mM to about 850 mM, about 800 mM to about 900 mM, about 850 mM to about 950 mM, about 900 mM to about 1M, about 10 mM to about 250 mM about 100 mM to about 500 mM, about 250 mM to about 750 mM, or about 500 mM to about 1M.

In some embodiments, submersion time ranges from about 5 minutes to about 12 hours, depending on the desired deposit thickness. For example, submersion time may be any of about 5 min, 10 min, 30 min, 60 min, 1 hr, 1.5 hr, 2 hr, 2.5 hr, 3 hr, 3.5 hr, 4 hr, 4.5 hr, 5 hr, 5.5 hr, 6 hr, 6.5 hr, 7 hr, 7.5 hr, 8 hr, 8.5 hr, 9 hr, 9.5 hr, 10 hr, 10.5 hr, 11 hr, 11.5 hr, or 12 hr, or any of about 5 min to about 30 min, about 10 min to about 60 min, about 30 min to about 60 min, about 30 min to about 1.5 hr, about 1 hr to about 2 hr, about 1.5 hr to about 2.5 hr, about 2 hr to about 3 hr, about 2.5 hr to about 3.5 hr, about 3 hr to about 4 hr, about 3.5 hr to about 4.5 hr, about 4 hr to about 5 hr, about 4.5 hr to about 5.5 hr, about 5 hr to about 6 hr, about 5.5 hr to about 6.5 hr, about 6 hr to about 7 hr, about 6.5 hr to about 7.5 hr, about 7 hr to about 8 hr, about 7.5 hr to about 8.5 hr, about 8 hr to about 9 hr, about 8.5 hr to about 9.5 hr, about 9 hr to about 10 hr, about 9.5 hr to about 10.5 hr, about 10 hr to about 11 hr, about 10.5 hr to about 11.5 hr, about 11 hr to about 12 hr, about 5 min to about 30 min, about 10 min to about 1 hr, about 1 hr to about 3 hr, about 2 hr to about 5 hr, about 1 hr to about 5 hr, about 2 hr to about 10 hr, about 5 hr to about 10 hr, about 5 hr to about 12 hr, about 7 to about 9 hr, or about 8 hr to about 12 hr.

In some embodiments, the temperature during submersion of the substrate in the aqueous solution is about 50° C. to about 90° C. For example, the temperature may be any of about 50° C., 55° C., 60° C., 65° C., 70° C., 75° C., 80° C., 85° C., or 90° C., or any of about 50° C. to about 60° C., about 55° C. to about 65° C., about 60° C. to about 70° C., about 65° C. to about 75° C., about 70° C. to about 80° C., about 75° C. to about 85° C., about 80° C. to about 90° C., about 50° C. to about 70° C., about 60° C. to about 80° C., about 70° C. to about 90° C., about 50° C. to about 75° C., about 75° C. to about 90° C., about 50° C. to about 80° C., about 60° C. to about 90° C., or about 50° C. to about 80° C.

The substrate may then be removed from the solution, rinsed, and dried, e.g., air dried.

In some embodiments, the coated substrate is then calcined, for example, at a temperature ranging from 200° C. to 600° C., for a duration ranging from 5 minutes to 48 hours. For example, the temperature may be any of about 200° C., 250° C., 300° C., 350° C., 400° C., 450° C., 500° C., 550° C., or 600° C., or any of about 200° C. to about 300° C., about 250° C. to about 350° C., about 300° C. to about 400° C., about 350° C. to about 450° C., about 400° C. to about 500° C., about 450° C. to about 550° C., about 500° C. to about 600° C., about 200° C. to about 400° C., about 300° C. to about 500° C., about 400° C. to about 600° C., about 200° C. to about 500° C., or about 300° C. to about 600° C. For example, the duration may be any of about 5 min to about 5 min, 10 min, 30 min, 60 min, 1 hr, 2 hr, 5 hr, 10 hr 15 hr, 20 hr, 25 hr, 30 hr, 35 hr, 40 hr, 45 hr, or 48 hr, or any of about 5 min to about 30 min, about 10 min to about 60 min, about 30 min to about 60 min, about 30 min to about 1.5 hr, about 1 hr to about 5 hr, about 3 hr to about 10 hr, about 5 hr to about 15 hr, about 10 hr to about 20 hr, about 15 hr to about 25 hr, about 20 hr to about 30 hr, about 35 hr to about 45 hr, about 40 hr to about 48 hr, about 1 hr to about 10 hr, about 5 hr to about 25 hr, about 10 hr to about 30 hr, about 15 hr to about 30 hr, about 20 hr to about 35 hr, about 30 hr to about 40 hr, or about 35 hr to about 48 hr.

The resulting material is a composite of a conversion layer and a deposit layer with a particularly useful morphology. In some embodiments, the resulting material includes a nanostructured morphology.

In some embodiments, the conversion layer and/or the deposited layer includes a dopant. A dopant, e.g., a metal in a smaller concentration than the metal that is the major contributor to the composition of the conversion layer and/or the deposited layer, may be included in the aqueous solution that contains a metal salt and an organic substance, as described above, or the substrate may participate in the reaction and contribute a dopant into the conversion layer and/or the deposited layer. For example, a dopant may include, but is not limited to, cerium, lanthanum, gadolinium, zinc, nickel, iron, cobalt, manganese, chromium, silver, tungsten, titanium, or copper. A dopant may provide desirable electrical, optical, and/or stress handling properties to the surface modification. Such doped surface modification materials may be useful in applications of use such as semiconductors or electrodes, or for lattice stress relief. In some embodiments, a dopant imparts bandgaps for conductivity, optical properties such as coloring, or stretch or pull in lattice spacing such that less stress is carried across the interface between the substrate and the conversion layer or between the conversion layer and the deposited layer.

The coincident processing methods described herein are designed to make use of the reactivity of the substrate with the metal-organic complex forming solution to generate a composite structure that comprises or consists of an inner conversion layer and an outer deposit layer. The times, temperatures, pH, solution compositions and resulting heat treatment steps all impact the characteristics of the resulting composite structure.

Several processing examples are provided herein. What is exemplified is that the resulting structure is generated during the initial coincident processing stage with the metal-organic complex is present. In cases where the metal-organic complex is present in insufficient quantity, no deposited layer (>1 μm, e.g., up to about 20 mm) is generated.

These results are demonstrated via analysis with an Energy-Dispersive X-ray spectroscopy (EDX) line scan across the resulting materials. These scans show the compositional changes across the coincident deposit structure, as described in Example 2 and FIG. 3. The aluminum substrate is shown on the right side of the scan (lower section of SEM). A central conversion layer section shows a primarily AlOx layer, but the general compositions of the conversion layer will be defined by the substrate and substrate reactivity with the processing solution characteristics. The outer layer shows a Mg rich layer, also defined by the processing solution. Clearly, different substrates, process conditions and solution compositions can be used to affect the composition of the conversion and outer layer.

Another distinct advantage of the coincident approach is the generation of gradients between the substrate and the conversion layer, as well as between the conversion and deposited layers. These gradients minimize interfacial stresses such as thermal expansion mismatch stresses. These gradients may also contribute to optical or electrical properties of the resulting film, such as, for example, electrical conductivity, ionic conductivity, or thermal conductivity.

The following examples are intended to illustrate, but not limit, the invention.

EXAMPLES

Example 1

A cleaned substrate is submerged in an aqueous solution that includes at least one transition metal salt and an organic component that forms a metal-organic complex. Concentrations of reactants range from about 10 mM to about 1 M, and submersion time ranges from about 5 minutes to about 12 hours, depending on the desired deposit thickness. The resulting material is a composite of a conversion layer and a deposit layer with a particularly useful morphology. The resulting layers are ceramic.

For example, an aluminum substrate was submerged in a solution with zinc nitrate as the transition metal salt at a concentration of 50 mM and hexamine at a concentration of 25 mM to 50 mM and a temperature of 90° C., for duration of 2 hours. The substrate was then removed from the solution, rinsed, and air dried. The coated substrate was then calcined at a temperature ranging from 200° C. to 600° C., for a duration ranging from 5 minutes to 48 hours. For example, the coating was calcined at a temperature of 550° C. for a duration of 24 hours. This resulted in a conversion layer on the surface that contains zinc and a concurrent deposit of zinc oxide that contains aluminum.

Optionally, the surface was then submerged in a dilute acid solution at pH 1 to 4 for a duration ranging from 1 minute to 24 hours. For example, the substrate was submerged in an acid solution at pH 3 for 24 hours.

The optional process outlined above results in a material which includes the exposure of at least a portion of the conversion layer.

Example 2

An aluminum panel material was cleaned to remove native oxide and surface roughness using a standard caustic etch and acid deoxidation precleaning procedure.

The aluminum substrate was submerged in an aqueous solution with primarily magnesium nitrate as the metal salt and hexamine as the complexing agent each at a concentration of approximately 50-100 mM, and a temperature of 70-85° C., for duration of 90 minutes. The substrate was restrained and the solution circulated. The substrate was then removed from the solution, rinsed, and air dried. The coated substrate was then calcined at a temperature of 400° C. for a duration of 1 hour.

The resulting structure was analyzed by a focused ion beam (FIB)/SEM technique resulting in the observation of a compact layer 1-5 μm in thickness adjacent to the substrate and a total layer thickness of 5-10 μm. The interface with the aluminum substrate was readily observable.

The FIB/SEM analysis showed three distinct layers—i) a deposit outer layer primarily including MgO with some aluminum; ii) a conversion layer primarily including aluminum oxide with some magnesium; and iii) the aluminum substrate.

FIGS. 2A-2D shows the scanning electron micrograph as well as energy dispersive X-ray spectroscopy (EDS) elemental maps of oxygen, magnesium, and aluminum of the resulting structure. FIG. 3 shows an EDS line scan across the depth of the of the substrate, indicating that between the deposit and conversion layer and the conversion layer and the substrate, there is a gradient

Example 3

An aluminum panel material was cleaned to remove native oxide and surface roughness using a standard caustic etch and acid deoxidation.

The aluminum substrate was submerged in an aqueous solution with primarily magnesium nitrate as the metal salt and hexamine as the complexing agent each at a concentration of approximately 50-100 mM, and a temperature of 70-85° C., for duration of 15 minutes. The substrate was restrained and the solution circulated. The substrate was then removed from the solution, rinsed, and air dried. The coated substrate was then calcined at a temperature of 400° C. for a duration of 1 hour.

The substrate is then re-immersed into the solution for an additional 90 minutes, then removed from the solution, rinsed, and air dried. The coated substrate was then re-calcined at a temperature of 400° C. for a duration of 1 hour.

Figure 4:
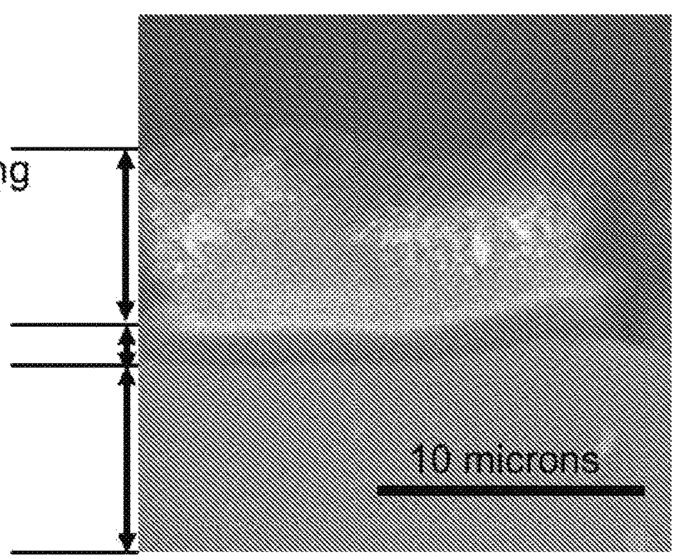
FIG. 4 shows a cross-sectional image of a surface as prepared by ion milling and cross-sectional scanning electron microscopy. The top layer is primarily MgO deposit layer containing Al. The conversion (middle) layer is primarily aluminum oxide with some magnesium. The bottom layer is the aluminum substrate.

The resulting structure was analyzed by a focused ion beam/scanning electron microscopy (FIB/SEM) technique resulting in the observation of a compact layer 1-7 μm in thickness adjacent to the substrate and a total layer thickness of 5-10 μm. The interface with the aluminum substrate was readily observable. The results are shown in FIG. 4.

Example 4

An aluminum panel material was cleaned to remove native oxide and surface roughness using a standard caustic etch and acid deoxidation. The cleaned substrate was initially submerged in an aqueous solution that included primarily magnesium nitrate, manganese nitrate, or cerium nitrate as the metal salt, with no complexing agent (organic material) present, at a concentration of approximately 50-100 mM, and a temperature of 70-85° C., for duration of 15 minutes at an acidic pH of 3-4. The substrate was restrained and the solution circulated. The substrate was then removed from the solution, rinsed, and air dried. The coated substrate was then calcined at a temperature of 400° C. for a duration of 1 hour.

The resulting structure did not contain any observable deposited layer thickness.

Example 5

A series of aluminum panels was cleaned to remove native oxide and surface roughness using a standard caustic etch and acid deoxidation.

Each of the aluminum substrates was submerged in an aqueous solution containing primarily manganese nitrate, nickel sulfate, cerium nitrate, or cobalt nitrate, respectively, as the metal salt and hexamine as the complexing agent, each at a concentration of approximately 25-100 mM, and pH controlled to ensure solubility for each metal using acid or base, and a temperature of 70-85° C., for duration of 30-120 minutes. In each case, the substrate was restrained and the solution circulated. Each substrate was then removed from the solution, rinsed, and air dried. The coated substrate was then calcined at a temperature of 400° C. for a duration of 1 hour.

The resulting structure was analyzed by visual observation and optical microscopy to estimate the layer thickness resulting in the observation of a total layer thickness of 5-10 μm.

Although the foregoing invention has been described in some detail by way of illustration and examples for purposes of clarity of understanding, it will be apparent to those skilled in the art that certain changes and modifications may be practiced without departing from the spirit and scope of the invention, which is delineated in the appended claims. Therefore, the description should not be construed as limiting the scope of the invention.

We claim:

1. A surface modification of a substrate that consists of a conversion layer and a deposited ceramic layer on the substrate surface, wherein the conversion layer is situated between the substrate surface and the deposited ceramic layer, wherein the substrate comprises a primary metal, wherein the primary metal is aluminum, wherein the conversion layer and the deposited ceramic layer comprise at least two metals in common, wherein one of the metals in common is the same as the primary metal in the substrate and one of the metals in common is different than the primary metal of the substrate, wherein the surface modification does not comprise a binder or a resin, and wherein the surface modification comprises less than 5% carbon by mass.

2. The surface modification according to claim 1, wherein the conversion layer comprises a thickness less than about 10 microns.

3. The surface modification according to claim 1, wherein the deposited ceramic layer comprises a thickness less than about 50 microns.

4. The surface modification according to claim 1, wherein the deposited ceramic layer comprises a metal oxide, a metal hydroxide, or a combination thereof.

5. The surface modification according to claim 4, wherein the deposited ceramic layer comprises one or more of a transition metal, a rare earth metal, silicon, and magnesium.

6. The surface modification according to claim 1, wherein the deposited ceramic layer is nanostructured.

7. The surface modification according to claim 1, wherein the substrate further comprises one or more of iron, iron alloy, carbon steel, stainless steel, galvanized steel, copper, a copper alloy, a zinc alloy, titanium, and a titanium alloy.

8. The surface modification according to claim 1, wherein the conversion layer comprises a ceramic material.

9. The surface modification according to claim 8, wherein the ceramic material of the conversion layer comprises a metal oxide, a metal hydroxide, or a combination thereof.

10. The surface modification according to claim 9, wherein the ceramic material of the conversion layer comprises one or more of a transition metal, a rare earth metal, silicon, and magnesium.

11. The surface modification according to claim 1, wherein the surface modification comprises additional surface functionalization that provides one or more additional functional properties.

12. The surface modification according to claim 1, wherein the surface modification further comprises gradients between the conversion layer the deposited ceramic layer.

13. A process to produce a surface modification according to claim 1, said process comprising: (a) a conversion step to deposit the conversion layer on said substrate surface; and (b) a deposition step to deposit the ceramic layer on said conversion layer, wherein the process does not comprise any intermediate processing between (a) and (b).

14. The process according to claim 13, wherein steps (a) and (b) occur in the same processing vessel.

15. The process according to claim 13, wherein steps (a) and (b) occur utilizing the same process fluid.

16. The process according to claim 15, wherein the process fluid is an aqueous solution that comprises at least one metal salt and at least one organic substance.

17. The process according to claim 16, wherein the organic substance is selected from hexamine, urea, triethylamine, and/or diethylamine.

18. The process according to claim 15, wherein steps (a) and (b) occur concurrently.

19. The surface modification according claim 1, wherein the substrate comprises a metal that is also comprised as a dopant in the deposited ceramic layer.

20. The surface modification according to claim 5, wherein the deposited ceramic layer comprises aluminum or tin.

21. The surface modification according to claim 10, wherein the ceramic material of the conversion layer comprises aluminum or tin.

22. The surface modification material according to claim 1, wherein the at least two metals in common in the conversion layer and the deposited ceramic layer comprise aluminum and magnesium.

23. The surface modification material according to claim 1, wherein the at least two metals in common in the conversion layer and the deposited ceramic layer comprise aluminum and zinc.

* * * * *